US011711771B2

(12) United States Patent
Ben Jemaa et al.

(10) Patent No.: US 11,711,771 B2
(45) Date of Patent: Jul. 25, 2023

(54) METHOD FOR EVALUATING THE ENERGY CONSUMPTION OF A SERVICE UNIT IN A COMMUNICATIONS NETWORK

(71) Applicant: Orange, Paris (FR)

(72) Inventors: Sana Ben Jemaa, Châtillon (FR); Salah Eddine El Ayoubi, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 45 days.

(21) Appl. No.: 17/255,288

(22) PCT Filed: Jun. 21, 2019

(86) PCT No.: PCT/FR2019/051525
§ 371 (c)(1),
(2) Date: Dec. 22, 2020

(87) PCT Pub. No.: WO2020/002802
PCT Pub. Date: Jan. 2, 2020

(65) Prior Publication Data
US 2021/0274448 A1    Sep. 2, 2021

(30) Foreign Application Priority Data

Jun. 25, 2018 (FR) ...................................... 1855667

(51) Int. Cl.
| | | |
|---|---|---|
| *H04W 52/36* | (2009.01) | |
| *H04L 43/0805* | (2022.01) | |
| *H04W 24/08* | (2009.01) | |
| *H04W 72/044* | (2023.01) | |
| *H04L 43/20* | (2022.01) | |
| *H04L 43/08* | (2022.01) | |

(52) U.S. Cl.
CPC ........... *H04W 52/365* (2013.01); *H04L 43/08* (2013.01); *H04L 43/0805* (2013.01); *H04L 43/20* (2022.05); *H04W 24/08* (2013.01); *H04W 72/0473* (2013.01)

(58) Field of Classification Search
None
See application file for complete search history.

(56) References Cited

U.S. PATENT DOCUMENTS

| | | | | |
|---|---|---|---|---|
| 2003/0097440 A1* | 5/2003 | Betge-Brezetz | ........ | H04L 41/20 709/224 |
| 2015/0140955 A1* | 5/2015 | Chakraborty | ..... | H04W 52/0203 455/574 |
| 2019/0273635 A1* | 9/2019 | McNamee | .............. | H04W 4/24 |

FOREIGN PATENT DOCUMENTS

| | | | |
|---|---|---|---|
| KR | 20170029263 A | * 3/2017 | |
| WO | WO-2020088802 A1 | * 5/2020 | ............ H04W 28/26 |

OTHER PUBLICATIONS

International Search Report and Written Opinion dated Aug. 14, 2019 for Application No. PCT/FR2019/051525.
"Environmental Engineering (EE); Measurement method for Energy efficiency of Network Function Virtualization (NFV) in laboratory environment", ETSI Draft Specification; 203 539, European Telecommunications Standards Institute (ETSI), 650, Route Des Lucioles; F-06921 Sophia-Antipolis; France, vol. TG EE EEPS EE Eco Environmental Product Standards, No. V0.0.7 May 31, 2018 (May 31, 2018), pp. 1-19, Retrieved from the Internet: URL: docbox.etsi.org/EE/EE-EEPS/70-Draft/EEPS19/EE-EEPS19v007.docx [retrieved on May 31, 2018].
"Environmental Engineering (EE); Study on methods and metrics to evaluate energy efficiency for future 5G systems", ETSI Draft Specification; 103 542, European Telecommunications Standards Institute (ETSI), 650, Route Des Lucioles; F-06921 Sophia-Antipolis ; France, vol. TG EE EEPS EE Eco Environmental Product Standards, No. V0.0.5 Nov. 21, 2017 (Nov. 21, 2017), pp. 1-19, XP014303353, Retrieved from the Internet: URL:docbox.etsi.org/EE/EE-EEPS/70-Draft/EEPS31/EE-EEPS31v005.docx [retrieved on Nov. 21, 2017] sections 5-7; pp. 11-18.
"3rd Generation Partnership Project; Technical Specification Group Services and System Aspects; Telecommunication management; Study on system and functional aspects of energy efficiency in 5G networks (Release 15)", 3GPP Standard; Technical Report; 3GPP TR 32.972, 3rd Generation Partnership Project (3GPP), Mobile Competence Centre; 650, Route Des Lucioles; F-06921 Sophia-Antipolis Cedex; France, vol. SA WG5, No. V0.5.0, Apr. 25, 2018 (Apr. 25, 2018), pp. 1-28, XP051451161, sections 4.2, 4.3; pp. 9-18, sections 5-7; pp. 18-25.
Chairman et al: "FG IMT-2020: Report on Standards Gap Analysis", 3GPP Draft; SG13-LS139ATT1 PLEN-208, 3$^{rd}$ Generation Partnership Project (3GPP), Mobile Competence Centre; 650, Route Des Lucioles ; F-06921 Sophia-Antipolis Cedex; France, Jun. 12, 2016 (Jun. 12, 2016), XP051110522, Retrieved from the Internet: URL:http://www.3gpp.org/ftp/Meetings_3GPP_SYNC/tsg_sa/SA/Docs/ [retrieved on Jun. 12, 2016] section 6.7; pp. 83, 84.

* cited by examiner

Primary Examiner — Jay L Vogel
(74) Attorney, Agent, or Firm — Knobbe, Martens, Olson & Bear, LLP

(57) ABSTRACT

A method is described of evaluating the energy consumption of a service unit rolled out, or intended for being rolled out, on a given infrastructure of a communications network. The method includes determining the energy consumption W_no measured on the infrastructure in the absence of the service unit, determining the energy consumption W_yes measured on the infrastructure in the presence of the service unit, and obtaining the energy consumption induced by rolling out the service unit by calculating the difference (W_yes−W_no). The disclosed technology is applicable to 5G networks.

11 Claims, No Drawings

METHOD FOR EVALUATING THE ENERGY CONSUMPTION OF A SERVICE UNIT IN A COMMUNICATIONS NETWORK

RELATED APPLICATIONS

This application is the U.S. National Phase of Application No. PCT/FR2019/051525 entitled "METHOD FOR EVALUATING THE ENERGY CONSUMPTION OF A SERVICE UNIT IN A COMMUNICATIONS NETWORK" and filed Jun. 21, 2019, which claims the benefit of French Patent Application No. 1855667, filed Jun. 25, 2018, each of which is incorporated by reference in its entirety.

The present invention relates to energy consumption in communication networks.

Methods for evaluating the energy consumption in a mobile access network are known, for example on the basis of the ETSI ES 202 706-V1.4.1 standard entitled "Measurement method for power consumption and energy efficiency of wireless access network equipment". Methods for evaluating the energy consumption in mobile networks, service by service, are also known, for example on the basis of the article by W. Yoro et al. entitled "Service-oriented sharing of energy in wireless access networks using Shapley value" (Computer Networks, 2017).

These methods consist in measuring the energy efficiency of a given service as a function of the intensity of the associated traffic, using an analytical model of energy consumption.

For example, in 5G networks, essentially three classes of services are considered:

"Enhanced Mobile Broadband (eMBB)": these are services in which users benefit from enhanced access to multimedia content, services and data, with enhanced performance and a more transparent user experience; these cases of use have various characteristics, for example:
  the case of use of a "hotspot" with a high density of users, a very high traffic capacity and relatively low user mobility; or
  the case of use of wide area coverage with seamless radio coverage providing data rates that are much improved over current rates, with medium to high user mobility;

"Ultra-reliable and low latency communications (URLLC)": these are services with stringent requirements with regard to characteristics such as rate, latency and availability; it is possible to cite as examples the wireless control of industrial manufacturing or production processes, remote medical surgery, the automation of distribution in a smart network, or transport security;

"Massive machine type communications (mMTC)": these are services characterized by a very large number of connected devices, usually transmitting a relatively small volume of data that are not very sensitive to transmission delays; the devices in question should be inexpensive and have a very long battery life.

It is clear that if each class of service were considered separately, and if a 5G network were designed for each of these classes of service, it would result in mutually very different access network architectures; however, the only economically and ecologically acceptable solution is represented by a common access network capable of providing these three classes of services.

It should also be noted that 5G technology is considered not only as a new radio access and network core architecture, but also as an orchestration platform where integrators can put together specialized services for their clients; this makes it possible to create a large number of services, which belong to the three service classes (eMBB, URLLC and mMTC) defined above, but with a plethora of requirements.

The concept of "service slice" then appeared as an effective way to be able to implement all of these services in a common infrastructure.

A service slice is defined as a virtual network constructed on a hardware infrastructure. The technique of service "slicing" consists in defining a number of service slices using the same hardware infrastructure. According to the ITU-T Y.3011 and Y.3012 standards, service slicing allows logically isolated network divisions, in which a service slice constitutes a unit of programmable resources, such as, computing and storage, wireless and wired capabilities. According to the 3GPP TR 22.891 standard, a service slice is associated with the communication service of a particular connection type with a specific way of handling the control and user planes for this service; to this end, a 5G service slice is made up of a set of 5G network functions and specific access network settings, which are combined for a specific business model or case of use. Service slicing is mainly associated with different market segments corresponding to different business areas, such as medical services, transport, cities, agriculture, industry, automotive, retail for the general public, construction, energy, logistics, or banks.

A service slice can describe an end-to-end system, that is to say that its functionalities can cover both the core network and the access network. A service slice can be seen as an independent network, with associated advantages such as security and the guarantee of the Service Level Agreement (or SLA). However, in contrast with the deployment of independent network infrastructures in the preceding generations of mobile radio networks, the service slices can be produced, completely or partially, on a common infrastructure layer, providing resources such as the frequency spectrum. Therefore, one of the main challenges in the implementation of the service slice concept lies in designing and managing multiple slices on the same shared infrastructure or the same resources in an efficient manner, while guaranteeing the SLA for each of these service slices.

The service slice concept therefore helps to set up these services in a flexible and dynamic manner, and helps to ensure end-to-end performance.

Each service slice of a communications network can be associated with specific performance indicators, such as Quality of Service (QoS) related to characteristics such as rate or latency. The present invention relates more particularly to the performance indicator linked to the energy consumption of a service slice.

While the performance indicators relating to QoS can be measured at the packet or packet stream level, the performance indicator relating to the measurement of energy consumption is more problematic, as the latter is related to the infrastructure, which is shared between the different service slices. The energy consumption caused by a service slice therefore depends not only on the traffic relating to the service slice in question, but also on other service slices and on other services sharing the same infrastructure. Thus, a service slice deployed alone, for example on a base station, will not cause the same energy consumption when it is deployed at the same time as another service slice.

In addition, the conventional methods for evaluating energy consumption, such as those mentioned above, are difficult to apply to service slices, given the wide variety exhibited by service slices in terms of traffic, target QoS and coverage characteristics, but also the complexity of the technologies for multiplexing these service slices at the infrastructure level (different numerologies, different control channel structures, use or otherwise of multiple transmit and/or receive antennas, and so on).

The present invention therefore relates to a method for evaluating the energy consumption of a service slice deployed, or intended to be deployed, on a given infrastructure of a communications network. Said method comprises the following steps:

a) determining the energy consumption W_no measured on said infrastructure in the absence of said service slice;

b) determining the energy consumption W_yes measured on said infrastructure in the presence of said service slice; and c) obtaining the energy consumption caused by the deployment of said service slice by calculating the difference (W_yes−W_no).

Of course, it is possible to reverse the order of steps a) and b), or first determine the two classes before determining their respective energy consumptions.

Thus, the present invention proposes a method for evaluating the energy consumption caused by a service slice on a given infrastructure (for example, a radio site) and in a given context (service slices coexisting on a given infrastructure, a given radio environment, and so on). According to the invention, the share of consumption of a service slice on an infrastructure equipment is evaluated pragmatically by comparison with other equipments having similar characteristics but not deploying the service slice in question: this takes into account the fact that, as explained above, the consumption share of a service slice is not necessarily the same when this service slice is deployed alone, and when this service slice shares the radio resources with other service slices.

By virtue of these provisions, a network operator or integrator can estimate the energy cost linked to the deployment of a new service slice. Furthermore, a client benefiting from a service slice can thus know the energy consumption of this service slice.

According to some particular features, said method comprises a preliminary phase, during which a database is constructed which indicates a respective measured energy consumption for a set of respective infrastructure classes, and:

in said step a), the class C_no to which said infrastructure belongs in the absence of said service slice is identified, and the energy consumption W_no recorded for said class C_no is read from said database; and in said step b), the class C_yes to which said infrastructure belongs in the presence of said service slice is identified, and the energy consumption W_yes recorded for said class C_yes is read from said database.

By virtue of these arrangements, it is easily possible to determine the energy consumption associated with any given infrastructure belonging to a set of infrastructures previously entered into said database.

According to some even more specific features, the construction of said database comprises the following steps:

determining a certain number of classes by classifying various infrastructures on the basis of selected technical characteristics of these infrastructures; and determining, on the basis of measurements, an energy consumption for each of said determined classes.

This first variant has the advantage that it is straightforward to implement. However, it has the drawback that care must be taken in parallel not to put radio sites possibly having very different energy consumptions in the same class.

According to other even more specific features:

measuring the energy consumption for a certain number of infrastructures, and generating radio site classes that are homogeneous in terms of energy consumption; and developing a model linking the technical features of said infrastructures to their energy consumption, and therefore to a corresponding class.

This second variant is more complex to implement than the first variant, but it automatically provides classes that are homogeneous in terms of energy consumption.

Correlatively, the invention relates to a system for evaluating the energy consumption of a service slice deployed, or intended to be deployed, on a given infrastructure of a communications network. Said system comprises means for:

determining the energy consumption W_no measured on said infrastructure in the absence of said service slice;

determining the energy consumption W_yes measured on said infrastructure in the presence of said service slice; and obtaining the energy consumption caused by the deployment of said service slice by calculating the difference (W_yes−W_no).

According to some particular features, said system further comprises means for constructing a database indicating a respective measured energy consumption for a set of respective infrastructure classes, and means for:

identifying the class C_no to which said infrastructure belongs in the absence of said service slice, and reading from said database the energy consumption W_no recorded for said class C_no; and identifying the class C_yes to which said infrastructure belongs in the presence of said service slice, and reading from said database the energy consumption W_yes recorded for said class C_yes.

According to some even more particular features, to construct said database, said system further comprises means for:

determining a certain number of classes by classifying various infrastructures on the basis of selected technical characteristics of these infrastructures; and determining, on the basis of measurements, an energy consumption for each of said determined classes.

According to other even more specific features, to construct said database, said system further comprises means for:

measuring the energy consumption for a certain number of infrastructures, and generating radio site classes that are homogeneous in terms of energy consumption; and developing a model linking the technical features of said infrastructures to their energy consumption, and therefore to a corresponding class.

The advantages afforded by these systems are essentially the same as those afforded by the correlative methods succinctly set forth above.

Said system for evaluating the energy consumption of a service slice may advantageously comprise at least one entity for managing service slices that is hosted in an access network node, in a core network node, or in an operations, administration and maintenance (OAM) center of said communications network.

It should be noted that said entity for managing service slices may be physical or virtual, and that it is possible to implement it in the context of software instructions and/or in the context of electronic circuits.

Another subject of the invention is a computer program that can be downloaded from a communication network and/or is stored on a computer-readable medium and/or can be executed by a microprocessor. This computer program is noteworthy in that it comprises instructions for executing the steps of the method for evaluating energy consumption succinctly set forth above when it is executed on a computer.

The advantages afforded by this computer program are essentially the same as those afforded by said method.

Other aspects and advantages of the invention will become apparent from reading the detailed description below of particular embodiments, which are given by way of non-limiting examples.

One embodiment of the method for evaluating the energy consumption of a service slice according to the invention will now be described.

This embodiment comprises a preliminary phase, during which a database is constructed which indicates a respective measured energy consumption for a set of respective infrastructure classes. In a non-limiting manner, a radio site, such as a base station of a cellular network, will be used as an example of an infrastructure.

According to a first variant, this construction implements the following steps.

In a step EP-1, various radio sites are classified by taking into account certain selected technical characteristics, such as:
 transmission power, coverage, the number of transmit and receive antennas, or the frequency band used;
 the radio environment, for example rural or urban; or
 traffic state, for example the types of active service slices, their traffic levels, or the level of interference measured.

Of course, other factors may be taken into account for the purposes of this classification.

In a step EP-2, an energy consumption for each of the classes determined in step EP-1 is determined on the basis of measurements.

Lastly, in a step EP-3, said database is constructed accordingly.

According to a second variant, this construction implements the following steps.

In a step EP'-1, the energy consumption for a certain number of radio sites is first measured, then classes of radio sites that are homogeneous in terms of energy consumption are generated.

In a step EP'-2, a model is developed which links the characteristics of the radio sites to their energy consumption, and therefore to a corresponding class.

Lastly, in a step EP'-3, said database is constructed accordingly.

To implement this second variant, and construct a model linking the characteristics of a radio site to its energy consumption class, it might be convenient to use known statistical data processing techniques, as well as artificial intelligence techniques, such as data clustering, in particular k-means clustering or supervised classification. It is recalled in this regard that k-means clustering is a data partitioning and combinatorial optimization method in which a set of elements is subdivided into k subsets (or "clusters"), so as to minimize a certain function.

These techniques may for example use neural networks, or naive Bayes classifiers. It is recalled in this regard that naive Bayes classification constructs models associated with characteristics that are assumed to be statistically independent.

When, following this preliminary phase, it is desired to evaluate the energy consumption of a given service slice S on a given infrastructure, the following steps are implemented.

According to a step EA-1, the class C_no to which said infrastructure belongs in the absence of the service slice S is identified, and the corresponding energy consumption W_no is read from said database.

According to a step EA-2, the class C_yes to which said infrastructure belongs in the presence of the service slice S is identified, and the corresponding energy consumption W_yes is read from said database.

Naturally, it is also possible, as a variant, to first determine said classes in a first step, then their respective energy consumptions in a second step.

Lastly, in a step EA-3, the energy consumption due specifically to the deployment of the service slice S is obtained by calculating the difference (W_yes−W_no).

The system for managing service slices according to the invention may be implemented, by means of software and/or hardware components, within one or more entities for managing service slices that are hosted in nodes of a communication network, such as nodes of an access network, for example in the cloud ("cloud RAN"), or nodes of a core network. Such an entity for managing service slices may also be deployed as a specific module in an operations, administration and maintenance (OAM) center of the network (or an equivalent); it is recalled in this regard that an OAM is a center responsible, in a conventional manner, for the collection and archiving of performance measurements.

Said software components may be integrated into a conventional computer program for managing a network node. It is for this reason, as indicated above, that the present invention also relates to a computing system. This computing system includes, as is conventional, a central processing unit that uses signals to control a memory, and also an input unit and an output unit. Moreover, this computing system may be used to execute a computer program that includes instructions for implementing whichever of the methods for evaluating energy consumption according to the invention.

Indeed, another subject of the invention is a computer program that can be downloaded from a communication network and comprises instructions for carrying out the steps of a method for evaluating energy consumption according to the invention when it is executed on a computer. This computer program may be stored on a computer-readable medium and may be able to be executed by a microprocessor.

This program may use any programming language, and may be in the form of source code, object code, or intermediate code between source code and object code, such as in a partially compiled form, or in any other desirable form.

Another subject of the invention is an irremovable, or partially or fully removable computer-readable information medium that includes instructions of a computer program such as is mentioned above.

The information medium may be any entity or device capable of storing the program. For example, the medium may comprise a storage means, such as a ROM, for example a CD ROM or a microelectronic circuit ROM, or a magnetic recording means, such as a hard disk, or else a USB stick ("USB flash drive").

Moreover, the information medium may be a transmissible medium such as an electrical or optical signal, which may be routed via an electrical or optical cable, by radio or by other means. The computer program according to the invention may in particular be downloaded to an Internet network.

As a variant, the information medium may be an integrated circuit in which the program is incorporated, the circuit being designed to execute or to be used in the execution of whichever of the methods for evaluating energy consumption according to the invention.

The invention claimed is:

1. A method of evaluating the energy consumption of a first service slice deployed, or intended to be deployed, on a given infrastructure of a communications network, the given infrastructure shared between a plurality of service slices, each of the plurality of service slices comprising an independent virtual network constructed on the given infrastructure, the first service slice comprising an end-to-end system whose functionalities cover both a core network and an access network of the communications network, the method comprising:
   constructing a database indicating a respective measured energy consumption for a set of respective infrastructure classes;
   determining an energy consumption W_no measured on the given infrastructure when the given infrastructure is in a first state corresponding to the absence of the first service slice by:
      identifying, based on technical characteristics of the given infrastructure, an infrastructure class C_no to which the given infrastructure belongs in the first state corresponding to the absence of the first service slice, the infrastructure class C_no selected from among the set of infrastructure classes of the database, and
      reading from the database the energy consumption W_no recorded for the infrastructure class C_no;
   determining an energy consumption W_yes measured on the given infrastructure when the given infrastructure is in a second state corresponding to the presence of the first service slice, the second state differing from the first state only in the presence of the first service slice by:
      identifying, based on technical characteristics of the given infrastructure, an infrastructure class C_yes to which the given infrastructure belongs in the second state corresponding to the presence of the first service slice, the infrastructure class C_yes selected from among the set of infrastructure classes of the database, and
      reading from the database the energy consumption W_yes recorded for the infrastructure class C_yes; and
   obtaining the energy consumption caused by the deployment of the first service slice on the given infrastructure by calculating the difference (W_yes−W_no).

2. The method of claim 1, wherein constructing the database comprises:
   determining a certain number of infrastructure classes by classifying various infrastructures on the basis of selected technical characteristics of these infrastructures; and
   determining, on the basis of measurements, an energy consumption for each of said determined infrastructure classes.

3. The method of claim 1, wherein constructing the database comprises:
   measuring an energy consumption for a certain number of infrastructures corresponding to radio sites, and generating radio site classes that are homogeneous in terms of energy consumption; and
   developing a model linking technical features of the infrastructures to their energy consumption, and therefore to a corresponding infrastructure class of the database.

4. A non-transitory, computer readable storage medium having stored thereon instructions which, when executed by a processor, cause the processor to implement the method of claim 1.

5. A computer comprising a processor and a memory, the memory having stored thereon instructions which, when executed by the processor, cause the computer to implement the method of claim 1.

6. The method of claim 1, wherein at least a second service slice is deployed on the given infrastructure, and wherein:
   the first state corresponds to the presence of the second slice and the absence of the first slice; and
   the second state corresponds to the presence of the first and second slices.

7. A system for evaluating the energy consumption of a first service slice deployed, or intended to be deployed, on a given infrastructure of a communications network, the given infrastructure shared between a plurality of service slices, each of the plurality of service slices comprising an independent virtual network constructed on the given infrastructure, the first service slice comprising an end-to-end system whose functionalities cover both a core network and an access network of the communications network, the system comprising a processor, the system configured to:
   construct a database indicating a respective measured energy consumption for a set of respective infrastructure classes;
   determine an energy consumption W_no measured on the given infrastructure when the given infrastructure is in a first state corresponding to the absence of the first service slice by:
      identifying, based on technical characteristics of the given infrastructure, an infrastructure class C_no to which the given infrastructure belongs in the first state corresponding to the absence of the first service slice, the infrastructure class C_no selected from among the set of infrastructure classes of the database, and
      reading from the database the energy consumption W_no recorded for the infrastructure class C_no;
   determine an energy consumption W_yes measured on the given infrastructure when the given infrastructure is in a second state corresponding to the presence of the first service slice, the second state differing from the first state only in the presence of the first service slice by:
      identifying, based on technical characteristics of the given infrastructure, an infrastructure class C_yes to which the given infrastructure belongs in the second state corresponding to the presence of the first service slice, the infrastructure class C_yes selected from among the set of infrastructure classes of the database, and
      reading from the database the energy consumption W_yes recorded for the infrastructure class C_yes; and
   obtain the energy consumption caused by the deployment of the first service slice on the given infrastructure slice by calculating the difference (W_yes−W_no).

8. The system of claim 7, wherein at least a second service slice is deployed on the given infrastructure, and wherein:
- the first state corresponds to the presence of the second slice and the absence of the first slice; and
- the second state corresponds to the presence of the first and second slices.

9. The system of claim 7, characterized in that wherein, in order to construct the database, the system is further configured to:
- determine a certain number of infrastructure classes by classifying various infrastructures on the basis of selected technical characteristics of these infrastructures; and
- determine, on the basis of measurements, an energy consumption for each of said determined infrastructure classes.

10. The system of claim 7, characterized in that wherein, in order to construct the database, the system is further configured to:
- measure an energy consumption for a certain number of infrastructures corresponding to radio sites, and generating radio site classes that are homogeneous in terms of energy consumption; and
- develop a model linking technical features of the infrastructures to their energy consumption, and therefore to a corresponding infrastructure class of the database.

11. The system of claim 7, further comprising at least one entity for managing service slices that is hosted in an access network node, in a core network node, or in an operations, administration and maintenance (OAM) center of said communications network.

\* \* \* \* \*